Patented Dec. 28, 1937

2,103,846

UNITED STATES PATENT OFFICE

2,103,846

TRIPHENYLMETHANE DYESTUFFS

Hans Grotowsky, Krefeld-Uerdingen, Germany, assignor to General Aniline Works, Inc., New York, N. Y., a corporation of New York No Drawing. Application October 2, 1936, Serial No. 103,669. In Germany October 8, 1935

5 Claims. (Cl. 260—68)

The present invention relates to a process for the manufacture of triarylmethane dyestuffs by introducing in any customary manner during the synthesis of the dyestuffs one or more aryl radicles containing one or more amino groups substituted by at least one arylated ethyl sulfonic acid radicle.

The new dyestuffs are produced in accordance with the known methods for the manufacture of triarylmethane dyestuffs. Thus for example an aromatic amine containing one or more amino groups substituted by at least one arylated ethyl sulfonic acid radicle can be condensed with an appropriate aldehyde to the corresponding leuco triarylmethane compound and the latter can be oxidized to the dyestuffs. Another method for the manufacture of dyestuffs consists in causing an arylated chloroethane sulfonic acid to act on a dyestuff of the triarylmethane series containing at least one primary or secondary amino group. Finally a suitable compound of the diarylmethane series can be employed as a starting material and provided that it does not already contain at least one amino group substituted by at least one arylated ethylsulfonic acid radicle, this can be introduced in accordance with the known methods prior to or after the synthesis of the triarylmethane dyestuffs.

When employing leuco compounds of the triarylmethane dyestuffs as starting material or when in the process of manufacture the new dyestuffs are obtained in the leuco form these can be converted into the dyestuffs by oxidation in the known manner.

The aryl radicles of the triarylmethane dyestuffs of this invention may be any aromatic radicle, such as for example, a phenyl or naphthyl radicle. This radicle may carry besides the sub-stituents mentioned before other substituents as is customary in the case of triarylmethane dyestuff, thus for example alkyl groups, such as methyl, ethyl and propyl groups, the phenolic oxy group, alkyl oxy groups, such as methoxy, ethoxy groups, halogen atoms, such as chlorine or bromine, amino groups substituted by other components than arylated ethyl sulfonic acid radcomponents, such as for example the dialkyl amino icles, such as for example the dialkyl amino group or diaryl amino group, furthermore the sulfonic acid group etc., it being especially mentioned that at least two aryl radicles of the dyestuffs must contain at least one auxochrome, for example, a phenolic hydroxy group, an alkylated phenolic hydroxy group, such as a methoxy or ethoxy group, an amino or substituted amino group, such as an alkyl amino group, for example, methyl, dimethyl, ethyl or diethyl amino group and naturally also an amino group substituted by at least an arylated ethyl sulfonic acid radicle the introduction of which in the dyestuff is the substance of this invention.

As starting materials for the manufacture of triarylmethane dyestuffs in accordance with this invention amino sulfonic acids are primarily suitable as are obtained by condensing an aromatic amine with an additive compound of chlorosulfonic acid to an organic compound comprising a double bond of aliphatic nature between two carbon atoms, one of which is connected with an aromatic nucleus in accordance with the process described in U. S. P. 2,097,726, issued November 2, 1937. According to the process of said patent chlorosulfonic acid can be caused to react in a smooth manner with organic compounds of the kind mentioned before especially in the presence of a solvent, such as diethyl ether, dipropyl ether etc. Among the organic compounds which are suitable for the purpose of this addition of chlorosulfonic acid may be mentioned styrene, vinyl naphthalene, acenaphthylene, isosafrol, cumarone and indene. Instead of these compounds substitution products thereof can be employed, as for example those compounds obtainable by the introduction of a halogen atom, such as for example a chlorine or a bromine atom or a nitro group, a sulfonic acid group, an alkyl group, such as for example a methyl, ethyl, propyl or butyl group, furthermore an aralkyl group, such as for example a benzyl group and several of the above mentioned atoms or groups.

In the resulting sulfonic acids, such as for example in the 1-phenyl-1-chloroethane-2-sulfonic acid obtainable by the addition of chlorosulfonic acid to styrene, the chlorine atom is readily replaceable. Thus by dropping the reaction mixture into a primary or secondary aromatic amine replacement of the chlorine by the aryl amine group takes place. From this mixture the aromatic amine carrying the amino group substituted by at least one arylated ethyl sulfonic acid radicle can be isolated by any known suitable manner.

The new dyestuffs are soluble in water, possess a very good clarity of dyeing and dye in a remarkable, fairly even manner. In the form of the alkali metal salts they are powders having a metallic luster, dyeing animal fibres generally red to reddish violet to blue and green shades.

The following examples will illustrate the invention.

Example 1

For this example an amino sulfonic acid being obtainable in the following manner is employed: An ethereal solution of 1 molecule of the additive compound of chloro-sulfonic acid to styrene obtainable according to Example 1 of U. S. Patent 2,097,726, is dropped at 0–10° C. into the three times molecular quantity of monoethyl aniline. By addition of alkali lye the reaction mixture is made alkaline and the excess monoethyl aniline driven off by water steam. Then the 1-phenyl-1-(ethyl-phenyl-)amino-ethane-2-sulfonic acid is precipitated with diluted sulfuric acid. This sulfonic acid is sulfonated to disulfonic acid according to the usual method; that is to say, 67 parts by weight of the sulfonic acid are stirred into a mixture of 112 parts by weight of concentrated sulfuric acid and 38 parts by weight of oleum (65%) at a temperature of 15° C.; then the reaction mixture is poured on ice precipitating the disulfonic acid as a white powder which is separated by filtration.

1 molecule of the disulfonic acid obtained in this manner is heated with 1 molecule tetraethyl diamino benzhydrol in aqueous, slightly acid solution until hydrol can no longer be detected. The leuco acid can be oxidized in accordance with the customary methods, for example by means of lead dioxide, manganese dioxide and the like. The resulting dyestuff is isolated by salting out. It dyes wool a clear violet-blue shade.

Example 2

The amino sulfonic acid employed in this example is produced in the following way: 1 molecule m-toluidine is condensed with 1 molecule 1-phenyl-1-chloroethane-2-sulfonic acid (obtainable by the addition of chlorosulfonic acid to styrene according to Example 1 of U. S. Patent 2,097,726) to the 1-phenyl-1-(m-tolyl-amino)-ethane-2-sulfonic acid according to the method mentioned in Example 1. This acid is then sulfonated with 1 molecule chloroethane sulfonic acid to the disulfonic acid. 1 molecule of this disulfonic acid is heated with 1 molecule tetramethyl diamino benzhydrol in aqueous slightly sulfuric acid solution until the hydrol is no longer present. After oxidizing in the known manner the leuco acid gives a dyestuff which dyes animal fibre a blue-violet shade.

Example 3

2 molecules of the amino sulfonic acid obtainable by condensation of the additive compound of chlorosulfonic acid to styrene with o-toluidine according to the process described in Example 1 are heated to boiling for 24 hours with diethyl amino benzaldehyde. In this manner a leuco acid is produced which on oxidizing with manganese dioxide furnishes a dyestuff dyeing wool clear reddish violet.

Example 4

The amino sulfonic acid used in this example is obtainable in the following manner: An ethereal solution of 1 molecule of the additive compound of chlorosulfonic acid to indene (obtainable according to Example 5 of U. S. Patent 2,097,726) is dropped at 0–10° C. into the three times molecular quantity of monoethyl aniline. The reaction mixture is made alkaline by the addition of alkali solution and the excess monoethyl aniline driven off by water steam. Then the 3-(ethyl-phenyl)-amino-indane-2-sulfonic acid is precipitated with diluted sulfuric acid. 2 molecules of this sulfonic acid are condensed with 1 molecule of diethyl amino benzaldehyde in such a manner as described in Example 3. A leuco acid is thus obtained, which after oxidation in the customary manner, yields a dyestuff which gives a violet-red shade on wool.

Example 5

For this example an amino sulfonic acid is employed obtainable in the following manner: An ethereal solution of 1 molecule of the additive compound of chlorosulfonic acid to cumarone (obtained according to the process of Example 4 of U. S. Patent 2,097,726) is given into the three times molecular quantity of monoethyl aniline at 0–10° C. Then the reaction mixture is made alkaline by the addition of alkali solution and the excess monoethyl aniline driven off by water steam. Now the 3-(ethyl-phenyl)-amino-cumarone-2-sulfonic acid is precipitated with diluted sulfuric acid. 2 molecules of this sulfonic acid are heated with 1 molecule of diethyl amino benzaldehyde in a slightly acid solution until the condensation is finished. After treatment with oxidizing agents the leuco acid yields a violet dyestuff.

Example 6

1 molecule o-chlorobenzaldehyde is boiled under reflux in aqueous solution for 24 hours with stirring with 2 molecules of the amino sulfonic acid obtainable by the condensation of 1-phenyl-1-chloroethane-2-sulfonic acid with o-toluidine according to the process mentioned in Example 1. On oxidation the resulting leuco acid yields a dyestuff which gives a clear green blue on wool.

Example 7

2 molecules of the 1-phenyl-1-(ethyl-phenyl)-amino-ethane-2-sulfonic acid obtainable according to the process described in Example 1 are heated in a 30% ethyl alcohol with 1 molecule formaldehyde until the methane condensation is complete. The volume is then brought to one litre, with advantage by means of 30% ethyl alcohol, 1 molecule of diethyl aniline and the calculated quantity of dichromate are added and the mixture stirred at 40° C. until the formation of dyestuff is no longer increased. The alcohol is then distilled off, the chromium oxide residue is filtered and the dyestuff precipitated from the filtrate by means of common salt solution. The dyestuff produces very clear blue-violet shades on wool.

I claim:

1. A triarylmethane dyestuff containing at least one aryl radicle carrying at least one auxochrome and at least another aryl radicle carrying at least one amino radicle substituted by at least one arylated ethylsulfonic acid radicle.

2. A triphenylmethane dyestuff containing at least one phenyl radicle carrying at least one auxochrome and at least another phenyl radicle carrying at least one amino radicle substituted by at least one phenylated ethylsulfonic acid radicle.

3. A triphenylmethane dyestuff containing one phenyl radicle substituted by a diethylamino radicle and two phenyl radicles, each of which carries one methyl and one amino radicle substituted by a phenyl ethylsulfonic acid radicle.

4. A triphenylmethane dyestuff containing one phenyl radicle carrying a diethylamino radicle and furthermore two phenyl radicles, each of which is substituted by an amino radicle carrying a phenyl ethylsulfonic acid radicle besides one ethyl radicle.

5. A triphenylmethane dyestuff containing one phenyl radicle substituted by a chlorine atom and two phenyl radicles, each of which carries a methyl radicle and one amino radicle substituted by a phenyl ethylsulfonic acid radicle.

HANS GROTOWSKY.